United States Patent [19]

Dagiel

[11] Patent Number: 4,478,325
[45] Date of Patent: Oct. 23, 1984

[54] SELF-ADJUSTING BEARING

[75] Inventor: Richard T. Dagiel, Elkgrove Village, Ill.

[73] Assignee: Aetna Bearing Company, Chicago, Ill.

[21] Appl. No.: 259,505

[22] Filed: May 1, 1981

[51] Int. Cl.³ .................. F16D 23/14; F16C 19/10
[52] U.S. Cl. ............................. 192/98; 192/110 B; 384/495; 384/612
[58] Field of Search ............... 192/98, 110 B; 308/184 A, 233; 384/420

[56] References Cited

U.S. PATENT DOCUMENTS

| | | | |
|---|---|---|---|
| 3,882,979 | 5/1975 | Limbacher et al. | 192/98 |
| 3,909,086 | 9/1976 | Keleshian | 308/233 |
| 3,920,107 | 11/1975 | Limbacher | 192/98 |
| 3,921,776 | 11/1975 | Sonnerat | 192/98 |
| 4,029,186 | 6/1977 | De Gennes | 192/98 |
| 4,046,436 | 9/1977 | Brown | 308/233 |
| 4,059,179 | 11/1977 | Ernst et al. | 192/98 |
| 4,228,882 | 10/1980 | Huber et al. | 192/98 X |
| 4,365,850 | 12/1982 | Perrichot et al. | 308/233 X |
| 4,371,068 | 2/1983 | Billet | 192/98 |

FOREIGN PATENT DOCUMENTS 2811195  9/1979  Fed. Rep. of Germany ........ 192/98

Primary Examiner—Rodney H. Bonck
Assistant Examiner—David D. House
Attorney, Agent, or Firm—Trexler, Bushnell & Wolters, Ltd.

[57] ABSTRACT

A clutch throwout bearing assembly comprises a bearing, a carrier plate, and a carrier sleeve upon which the carrier plate and bearing are mounted. The mounting arrangement permits the bearing to be radially shifted, axially shifted, or tilted to adapt the plane of the bearing to the plane of the clutch fingers in situations involving misalignment of the bearing and clutch fingers due to tolerance build up between the clutch fingers and the bearing.

10 Claims, 9 Drawing Figures

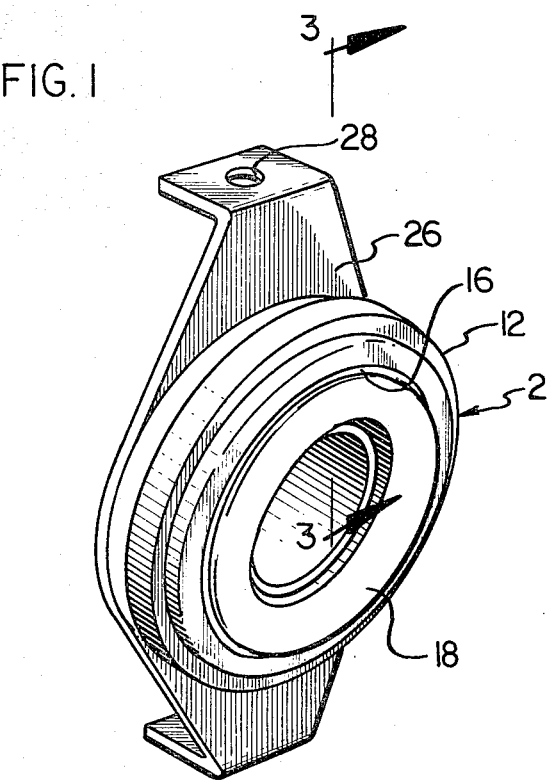
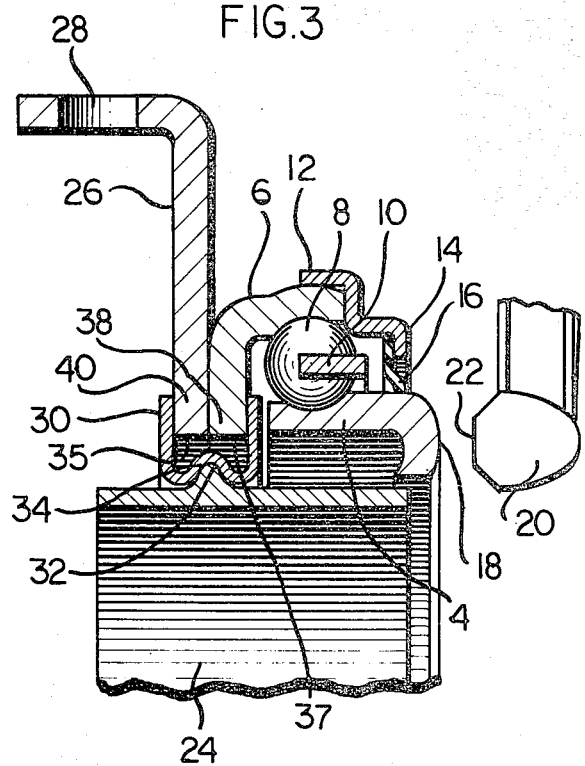
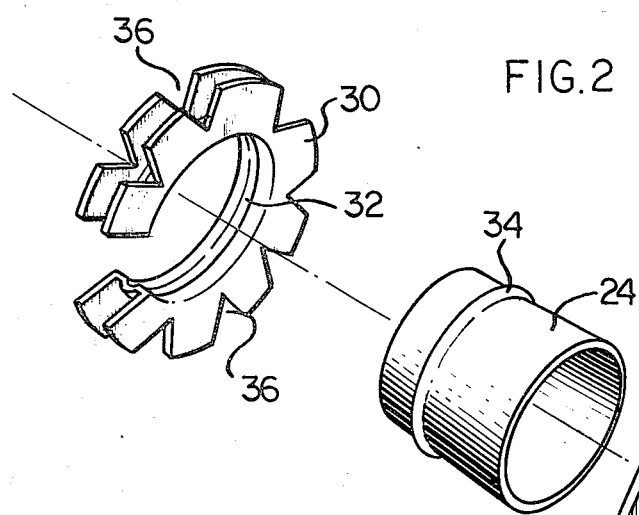
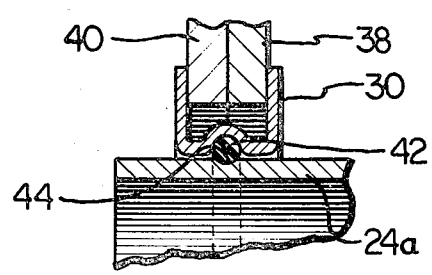
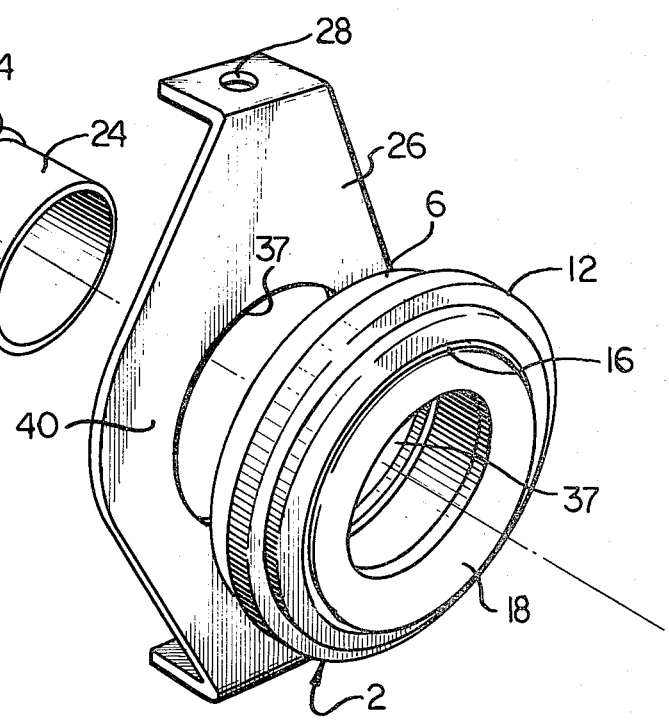

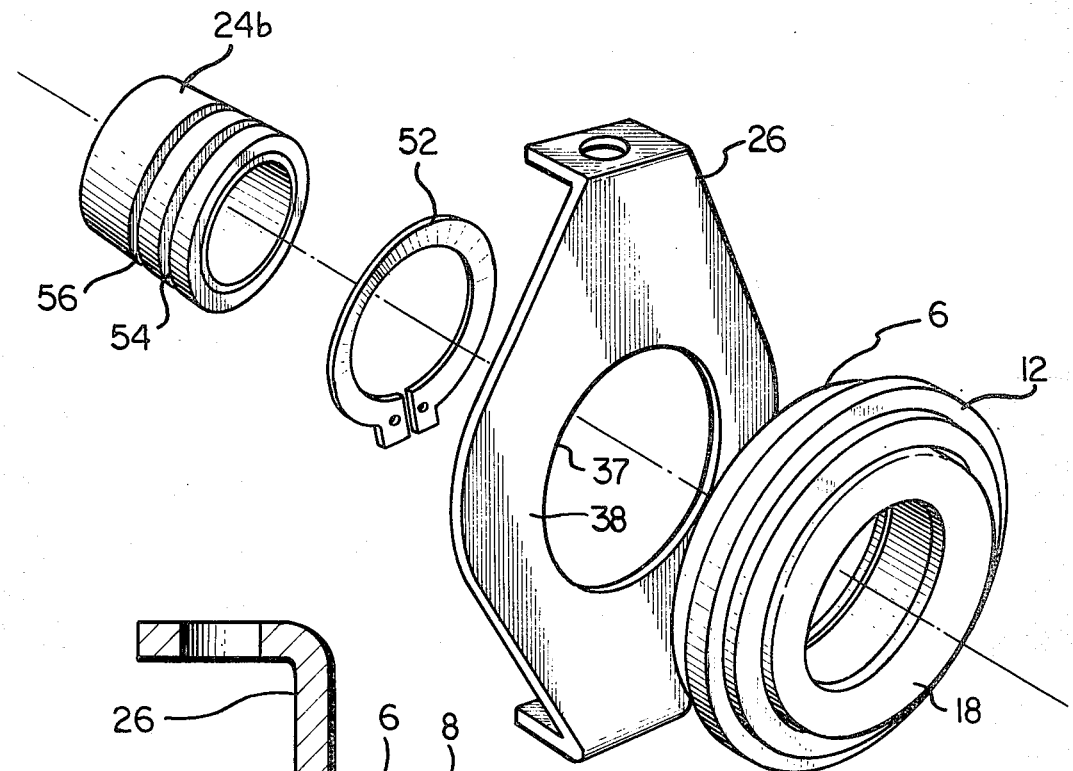
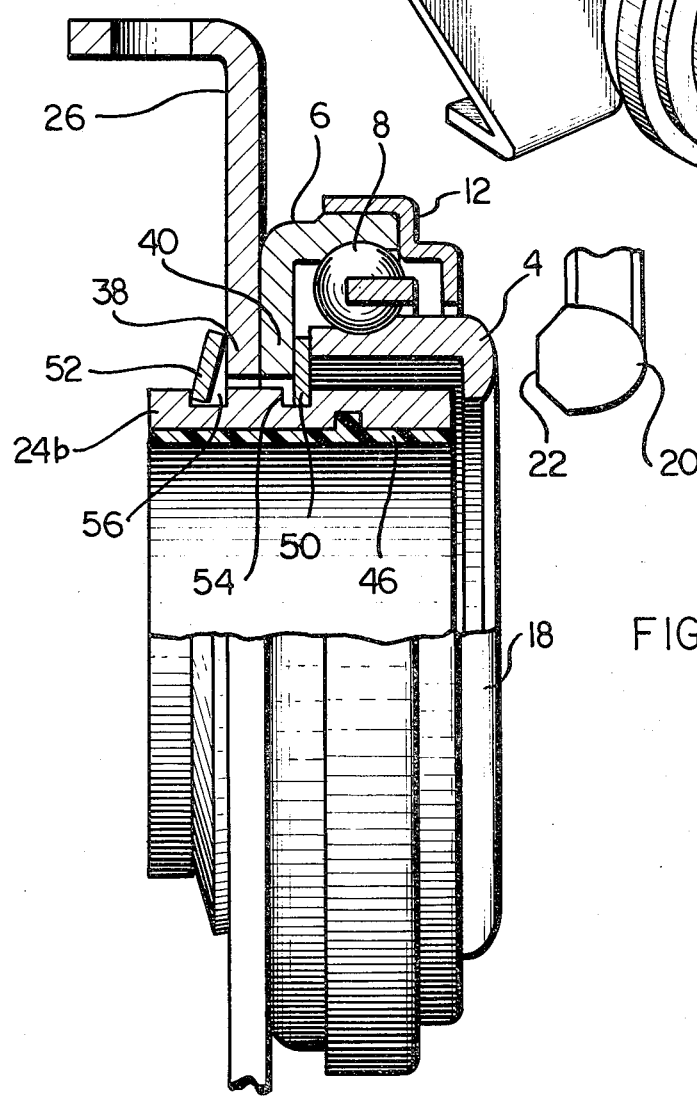
FIG. 5
FIG. 6

SELF-ADJUSTING BEARING

BACKGROUND OF THE INVENTION

This invention relates generally to self-adjusting bearings, and more particularly to a clutch throwout bearing which adjusts itself for proper engagement with the clutch fingers.

In the automotive industry a problem is encountered from time to time in the misalignment of the clutch release or throwout bearing with the clutch fingers. This problem arises from tolerance buildup resulting from the use of components with a rather wide range of tolerances. The worst case is that where a component with a maximum tolerance is assembled with another component of minimum tolerance, a situation which sometimes occurs in the absence of selected assembly procedures. In the usual clutch the actuating fingers have regions which are in a plane and which are engaged by the throwout bearing. In tolerance buildup situations the plane of the clutch fingers may be oriented askew to or eccentric from what is intended. That is, the plane of the clutch fingers are not perpendicular to the axis of the throwout bearing. Thus, the clutch fingers are "out of plane" while the throwout bearing is "in plane". Under these circumstances uneven pressure is placed upon the bearing causing accelerated wear as well as an undue level of noise and vibration.

OBJECTS AND SUMMARY OF THE INVENTION

An object of this invention is to provide a bearing assembly which is self-adjusting or self-compensating in that it can adjust to an out of plane or misaligned condition of the clutch fingers so that the bearing can perform in an out of plane condition. For this purpose the bearing is permitted to move relative to its carrier plate and carrier sleeve so that the bearing can assume a somewhat tilted position or a radially offset (eccentric) position, or both, with respect to the carrier plate axis and the axis of the quill shaft upon which the throwout bearing slides. This modified or out-of-plane condition is maintained while the clutch is fully engaged so that effectively the bearing is able to shift its axis of rotation to accommodate the plane of the clutch fingers.

A further object of this invention is to provide a bearing arrangement which is relatively inexpensive to construct and yet reduces bearing wear in clutch assemblies wherein the tolerance variations have not cancelled each other out, namely where there is a tolerance buildup.

A still further object of this invention is to provide a bearing arrangement of the type stated which can be readily embodied into existing designs of clutch throwout bearing assemblies.

In accordance with the foregoing objects the invention provides a clutch throwout bearing assembly comprising carrier sleeve, a bearing surrounding said sleeve, said bearing having a race rotatable relative to said sleeve and driving means for actuation of a plurality of clutch fingers, a plate for shifting the assembly axially toward the clutch fingers, and means for mounting the bearing and plate on said sleeve such that the bearing is universally shiftable relative to said carrier sleeve to adjust for misalignment of the clutch fingers relative to the bearing. Thus, the plane of the bearing adapts to the plane of the clutch fingers.

BRIEF DESCRIPTION OF THE FIGURES

FIG. 1 is a perspective view of a clutch throwout bearing constructed in accordance with and embodying the present invention;

FIG. 2 is an exploded perspective view of the bearing assembly;

FIG. 3 is an enlarged fragmentary sectional view taken along line 3—3 of FIG. 1;

FIG. 4 is a fragmentary sectional view through the axis of the bearing and showing a modified form of the invention;

FIG. 5 is an exploded perspective view of a further modification of the invention;

FIG. 6 is a side elevational view, partially broken away and in section, of the bearing assembly of FIG. 5;

In the drawing like reference numerals indicate like parts.

DETAILED DESCRIPTION

Figure 7:
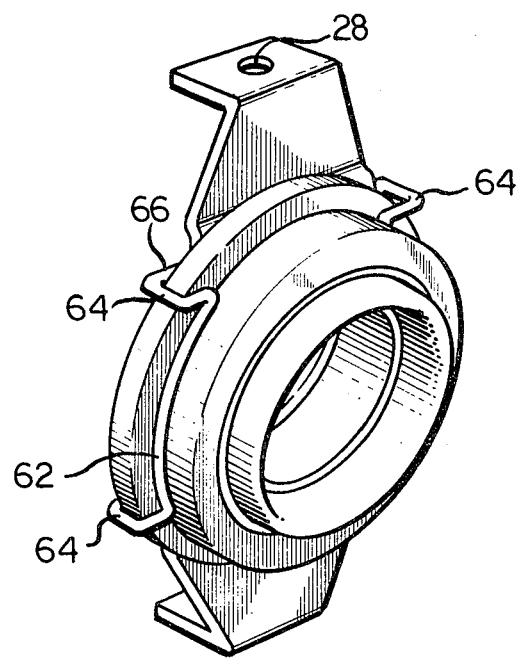
FIG. 7 is a fragmentary perspective view of yet another form of the invention.

Referring now in more detail to the drawing, particularly to FIGS. 1-3, there is shown a clutch throwout bearing assembly comprising a bearing proper 2 that includes inner and outer races 4, 6 with antifriction elements, such as balls 8, between the races 4, 6. Ball separaters 10 are between the balls 8. The races 4, 6 are held together in assembled relationship with the balls 8 by a shell 12 which surrounds and engages the outer race 6. The shell 12 includes a flange 14 projecting radially toward the inner race 4 leaving a space at which a seal 16 is positioned. The inner race 4 has a radially inwardly projecting flange 18 adapted for engagement with a plurality of circumferentially disposed clutch fingers 20, one of which is shown in the drawing, FIG. 3. The clutch fingers 20 have regions 22 which define a plane substantially perpendicular to the axis of rotation of the clutch, which ordinarily should be the same as the axis of rotation of the bearing 2.

The bearing assembly further includes a carrier sleeve 24 which fits about a quill shaft (not shown) and is axially movable relative thereto in a conventional manner. The carrier sleeve 24 is ordinarily coaxial with the axis of rotation of the inner race 4 and the central axis of the clutch. A carrier plate 26 is utilized in a conventional manner to shift the entire bearing assembly (including the carrier plate) axially toward and away from the clutch fingers 20. For this purpose carrier plate 26 has holes 28 for attachment to a clutch pedal by way of a fork arrangement (not shown) to effect axial movement of the assembly.

The carrier plate 26 and the bearing 2 are attached to the carrier sleeve 24 by a split or C-shaped snap ring 30. This snap ring 30 is of generally U-shaped cross-section as best seen in FIG. 3; however, the base of the snap ring 30 is formed with a radially inwardly opening circumferential groove 32. The groove 32 is adapted to seat in a raised annular rib 34 on the outer surface of the carrier sleeve 24. The sides of the ring 30 are formed with V-shaped notches 36 to enhance the resilient flexibility of the snap ring 30. The carrier plate 26 and the inner race 6 each has a central circular opening 35, 37 which is of larger diameter than the maximum diameter of the part of the snap ring 30 that defines the groove 32, as best seen in FIG. 3. Thus, the outer race 6 and the carrier 26 have annular portions 38, 40 which are adjacent to each other but which are disposed within the confines of the sides of the snap ring 30. In this arrangement, due to the resiliency of the snap ring 30, there is modicum of movement permitted between the carrier plate 26, the bearing 2, and the carrier sleeve 24. This movement permits relative axial, radial and rocking movement of the bearing 2 relative to the carrier sleeve 24 and the carrier plate 26. The result is a universal movement on the part of the bearing 2 to the extent necessary to enable the bearing to adapt itself concentrically, radially, and axially to accommodate out of plane or misalignment of the clutch fingers 20. Consequently, when the clutch is fully engaged, namely when the flange 18 has pressed the clutch fingers 20 to the full-engaged position, the bearing 2 will shift from its normal position and adapt itself to the plane of the clutch fingers 20.

In assembly of the components the snap ring 30 is compressed sufficiently so that the annular peripheral portions 38, 40 are in line to be received by the snap ring 30, whereupon the snap ring 30 is released and allowed to expand to capture the annular portion 38, 40. Thereafter, the snap ring 30 with assembled carrier plate and bearing are placed over the carrier sleeve 24 and radially expanded until the groove portion 32 snap fits over the raised rib 34.

A modified form of the invention is shown in FIG. 4 in which the annular rib 34 on the carrier sleeve 24a is replaced by an elastomeric O-ring 42 that seats in a radially outwardly opening annular groove 44 in the carrier sleeve 24a. By this arrangement the bearing 2 and the C-shaped snap ring 30 are capable of rocking movement to tilt the axis of the bearing 2 relative to the axis of the sleeve 24. The elastomeric ring 42 also permits a slight amount of radial movement of the snap ring 30. Thus, the arrangement of FIG. 4 provides for a universal movement of the bearing as occurs in the arrangement of FIGS. 1-3.

FIGS. 5 and 6 show a further modified form of the invention in which the carrier sleeve 24b is provided with an inner plastic liner 46. In place of the C-shaped snap ring of FIGS. 1-4 the annular portions 38, 40 are retained by a pair of axially spaced split snap rings 50, 52. The snap ring 50 seats in an annular groove 54 and is disposed between the inner and outer races 4, 6. The snap ring 52 is of generally conical shape and is of the Belville type of resilient split ring said is seated in an annular groove 56. The snap ring 52 imposes axial pressure against the annular portion 38 to urge the carrier plate 26, the bearing 2 and the resilient snap ring 50 to the right, reference being made to FIG. 6. Nevertheless, the resiliency of the snap ring 52 allows rocking and radial movement of the bearing 2 and the carrier plate 26 within the elastic limits of the snap ring 52 so as to shift the axis of rotation of the bearing universally to compensate for misalignment of the clutch fingers 20 and the bearing 2. Thus, as in previous embodiments, the present invention allows the bearing to run "out of plane" by adapting the "plane" of the bearing to the plane of the clutch fingers.

Figure 8:
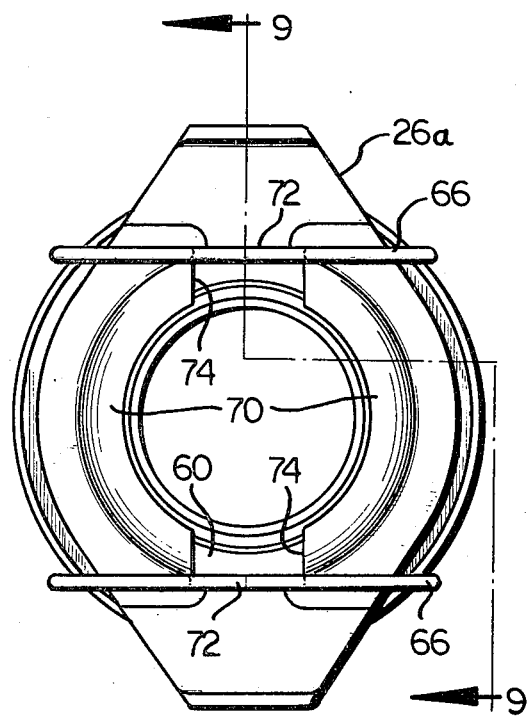
FIG. 8 is a rear elevational view of the bearing assembly of FIG. 7.
Figure 9:
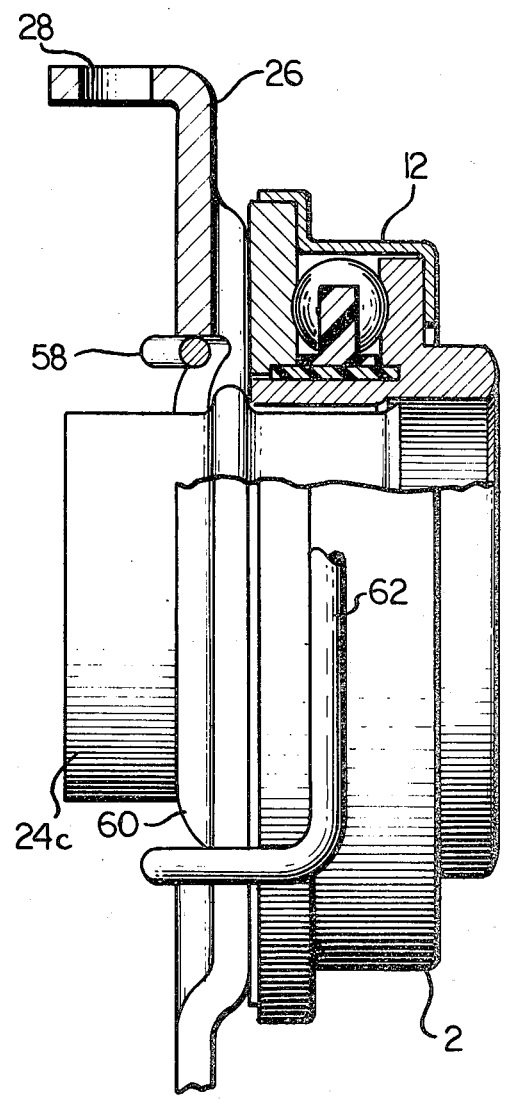
FIG. 9 is a sectional view, on an enlarged scale, taken approximately along line 9—9 of FIG. 8.

FIGS. 7-9 shows still another modification of the invention which is similar to the form shown on FIGS. 5 and 6, except that the Belville spring type of snap ring is replaced by a resilient wire clip 58. This clip 58 retains the assembled bearing 2 and the carrier plate 26 with the carrier sleeve 24c. The carrier sleeve 24c is formed with an annular raised bead which is between the bearing 2 and the carrier plate 26. The clip 58 urges the bearing 2 and carrier plate 26 against opposite sides of the bead 60, but the resiliency of the clip 58 permits a universal movement of the bearing so that if misalignment with the clutch fingers occurs the bearing can be brought into plane with the clutch fingers.

The clip may be of any suitable form, for example having arcuate sections 62 that fit over the bearing shell 12, and at the end of the arcuate section 62 are U-segments 64. Disposed across the carrier plate 26c are bights 66, 66 which urge the carrier plate 26c against the bead 60. Carrier plate 26c, furthermore, have arcuate hollow portions 70, 70 which overlie the bead 60. The bights 66, 66 may also be offset as at 72, 72 to fit in notches 74, 74 in the plate 26c to aid in preventing the clip 58 from separating from the rest of the assembly.

The invention is claimed as follows:

1. A clutch bearing assembly comprising: a carrier sleeve; a bearing arrangement having a first race means for engagement with a plurality of clutch fingers, a second race means, and a plurality of bearing elements disposed between said first and second race means; a carrier plate adapted for attachment to an actuator for shifting the bearing arrangement axially toward the clutch fingers; and mounting means for maintaining the said carrier plate and the bearing arrangement in assembly on said carrier sleeve, said mounting means permitting the carrier plate and the bearing arrangement to move radially relative to said carrier sleeve, while also permitting said bearing arrangement to move radially relative to said carrier plate with said mounting means maintaining the carrier plate and bearing arrangement in the assembled condition; such that any coaxial misalignment between the clutch fingers and the carrier sleeve may be accommodated by movement of the bearing arrangement relative to the carrier sleeve and the carrier plate, and also relative movement of the carrier plate relative to said carrier sleeve when the first race means of the bearing arrangement is brought into engagement with said clutch fingers.

2. A clutch bearing assembly according to claim 1, wherein said carrier plate and the second race means of the bearing arrangement are apertured and disposed in surrounding position with respect to the carrier sleeve, the respective apertures being of a diameter greater than that of the carrier sleeve to permit the relative radial movement, and said second race means and the carrier plate being in radially sliding contact.

3. A clutch bearing assembly according to claim 1, wherein said mounting means comprises: a split, generally annular, U-shaped ring mounted to the carrier sleeve and having the open portion of said U-shaped configuration facing radially outwardly, with peripheral portions of said second race means and said carrier plate being received in the radially outwardly facing open portion of said U-shaped ring, such that said ring maintains the carrier plate and bearing arrangement in assembly with the carrier sleeve while permitting said relative movement to accommodate said misalignment.

4. A clutch bearing assembly according to claim 1, wherein said mounting means comprises a pair of split snap rings carrier by said carrier sleeve at axially spaced locations, said carrier plate and said second race means being disposed in surrounding engagement with respect to said carrier sleeve, with the diameter of said aperture in said second bearing means being greater than the outermost diameter of said carrier sleeve, the peripheral surface portions of said carrier plate and second bearing means being disposed between said split snap rings, such that the snap rings maintain the carrier plate and bearing arrangement in assembly with respect to said carrier sleeve while permitting said relative movement to accommodate said misalignment.

5. A clutch bearing assembly according to claim 1, wherein said mounting means comprises a spring clip, said carrier plate and said second bearing means being apertured and disposed in surrounding engagement with respect to said carrier sleeve, the diameter of said apertures being greater than the outer diameter of said carrier sleeve, said spring clip having portions disposed on diametrically opposite sides of said carrier sleeve thereby to maintain said carrier plate and bearing assembly in assembly with said carrier sleeve while permitting relative movement therebetween to accommodate said misalignment.

6. A clutch bearing assembly according to claim 1, wherein said mounting means further includes means providing for tilting movement of the carrier plate and bearing assembly with respect to said carrier sleeve.

7. A clutch bearing assembly comprising: a carrier sleeve; a bearing arrangement having a first race means for engagement with a plurality of clutch fingers, a second race means, and a plurality of bearing elements disposed between said first and second race means; a carrier plate adapted for attachment to an actuator for shifting the bearing arrangement axially toward the clutch fingers; and mounting means for maintaining the said carrier plate and the bearing arrangement in assembly on said carrier sleeve, said mounting means permitting the carrier plate and the bearing arrangement to move relative to said carrier sleeve, while also permitting said bearing arrangement and said carrier plate to move relative to each other when in the assembled condition, such that any coaxial misalignment between the clutch fingers and the carrier sleeve may be accommodated by relative movement between the carrier plate, the bearing arrangement, and the carrier sleeve when the first race means of the bearing assembly is brought into engagement with said clutch fingers, said mounting means comprising; a split, generally annular U-shaped ring having the open portion of said U-shaped configuration facing radially outwardly, and means mounting said U-shaped ring to the carrier sleeve; and said carrier plate and second race means being apertured and disposed in surrounding engagement with respect to said carrier sleeve, the respective apertures therein being of a diameter greater than the diameter of said carrier sleeve, with the peripheral portions of said apertures being received in the radially outwardly facing open portion of said U-shaped ring, such that said ring maintains the carrier plate and bearing arrangement in assembly with the carrier sleeve while permitting relative movement to accommodate said misalignment.

8. A clutch bearing assembly according to claim 7, wherein the means mounting said split, U-shaped ring to said carrier sleeve, includes means providing for relative tilting movement of said U-shaped ring, which correspondingly provides for tilting movement of the carrier plate and bearing assembly with respect to said carrier sleeve.

9. A clutch bearing assembly according to claim 8, wherein said means mounting the split, U-shaped ring to the carrier sleeve and providing for the relative tilting movement comprises a raised annular rib on said carrier sleeve having an arcuate surface portion, and a correspondingly shaped groove formed in the radially intermost facing surface of the U-shaped ring, which groove receives said rib and permits said tilting movement while maintaining said U-shaped ring in mounted assembly with said carrier sleeve.

10. A clutch bearing assembly according to claim 8, wherein said means mounting the split U-shaped ring to the carrier sleeve for relative tilting movement comprises; an elastomeric ring carried by said carrier sleeve, and an annular groove formed in the radially intermost facing surface of the U-shaped ring, which groove receives said elastomeric ring, with the elasticity of said ring facilitating said tilting movement.

* * * * *